United States Patent
Arai et al.

(10) Patent No.: US 8,424,030 B2
(45) Date of Patent: Apr. 16, 2013

(54) OPTICAL PICKUP DEVICE AND LASER WELDING STRUCTURE OF OPTICAL COMPONENTS

(75) Inventors: Satoshi Arai, Yokohama (JP); Hiroaki Furuichi, Kawasaki (JP); Mitsuo Satake, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 773 days.

(21) Appl. No.: 12/421,701

(22) Filed: Apr. 10, 2009

(65) Prior Publication Data
US 2010/0034070 A1  Feb. 11, 2010

(30) Foreign Application Priority Data

Aug. 8, 2008 (JP) .................. 2008-205199

(51) Int. Cl.
*G11B 7/00* (2006.01)
*G02B 7/02* (2006.01)

(52) U.S. Cl.
USPC ............. 720/681; 359/811; 369/112.23

(58) Field of Classification Search ......... 156/272.8; 219/121.6, 121.63, 121.64, 121.78–121.86; 264/482; 359/642, 719, 808, 811–830; 369/44.23–44.24, 112.01, 112.23–112.26; 720/652, 654, 657–659, 672, 681–688
See application file for complete search history.

(56) References Cited

U.S. PATENT DOCUMENTS
6,324,010 B1 * 11/2001 Bowen et al. .............. 359/622

FOREIGN PATENT DOCUMENTS

| JP | 2000242960 A | * | 9/2000 |
|----|--------------|---|--------|
| JP | 2004-020867 | | 1/2004 |
| JP | 2004-261986 | | 9/2004 |
| JP | 2004-354438 | | 12/2004 |
| JP | 2005-119050 | | 5/2005 |
| JP | 2005-231308 | | 9/2005 |

OTHER PUBLICATIONS

Machine-Assisted Translation of JP 2004354438 A.*
Machine-Assisted Translation of JP 2000242960 A.*

* cited by examiner

*Primary Examiner* — Nathan Danielsen
(74) *Attorney, Agent, or Firm* — Antonelli, Terry, Stout & Kraus, LLP.

(57) ABSTRACT

To provide a reliable optical pickup device, a pickup case and an optical component including a lens are fixed by laser welding to increase the welding strength and reduce the positional displacement due to environmental changes. In a laser welded portion between a pickup case and an optical component including a lens, the optical component is provided with a joint portion having a convex protrusion at a portion to be joined to the pickup case. Laser beam irradiation is performed extending longer than the protrusion to form a thick welded portion at an end of the protrusion, in order to increase welding strength between the optical component and the pickup case.

10 Claims, 10 Drawing Sheets

OPTICAL PICKUP DEVICE AND LASER WELDING STRUCTURE OF OPTICAL COMPONENTS

CLAIM OF PRIORITY

The present application claims priority from Japanese Patent Application JP 2008-205199 filed on Aug. 8, 2008, the content of which is hereby incorporated by reference into this application.

FIELD OF THE INVENTION

The present invention relates to an optical pickup device for recording and reproducing an optical disk in an optical disk drive apparatus, and more particularly, to a technique for fixing an optical component within the optical pickup device.

BACKGROUND OF THE INVENTION

An optical pickup device is used for recording and reproducing optical disks such as CD, DVD, and Blu-ray (registered trademark) disk. In the optical pickup device, an output light from a light emitting element such as a laser diode is guided to an objective lens through various lenses, prisms, mirrors, and the like, and the light is concentrated on an optical disk. Then, a return light from the optical disk is received by a photodiode through various lenses, mirrors, and the like. Thus, an optical signal is converted to an electrical signal by the photodiode.

In this configuration, the optical component such as various lenses is placed and fixed at a predetermined position on an optical path of a pickup case. Fixing the optical component requires a high accuracy of the order of sub-micron. Most commonly, the optical component is positioned with a jig, and an ultraviolet curable adhesive is applied to a predetermined position to fix the optical component by irradiating ultraviolet light. However, the optical component fixed with the ultraviolet curable adhesive is not an ideal configuration because of fluctuations in application positions and amounts of the adhesive. A long-term displacement of the optical component is likely to occur, resulting in a decrease in reliability of the optical pickup device. Further, the annealing time and the ultraviolet irradiation time should be increased in order to stabilize and fully cure the adhesive. This has created a problem of productivity.

Thus, to replace the fixing method using an adhesive there has been proposed a method of welding an optical component to a case by a laser beam, in order to increase the positional stability of the optical component and its productivity. This laser welding technique is used not only for fixing optical components, but also for fixing various types of components in industrial areas. In laser welding, in general, welding is performed on a line or circle by scanning a laser source or a fixing jig, in order to ensure the welding area.

However, when the laser source or fixing jig is scanned, excessive welding is likely to occur in particular at the scan end portion, often resulting in a poor state of welding such as generation of void. Cycloolefin resin is the most commonly used lens material for the optical pickup, and PPS (polyphenylene sulfide) is the resin often used for the pickup case. Particularly, the PPS resin contains glass filler to increase rigidity and has a tendency to have a low linear expansion coefficient.

Thus, when the laser-welded or heated resin is rapidly cooled, considerable stress occurs as a function of the difference in the linear expansion coefficient between the lens material and the pickup case material. Particularly large residual stress occurs at the end portion of scan welding. As a result, peeling often occurs at the end portion in the welding process, which has been a problem to be solved. In addition, the reliability test has confirmed that the peeling necessarily develops from the end portion. Thus, in order to take advantage of the unique characteristics of laser welding, such as an increase in the positional stability of the optical component as well as a short tact time line, it is necessary to have a structure that prevents the peeling of the end portion in laser scanning.

JP-A No. 20867/2004 describes that in a film unit with lens and made from plural parts, the production cost is reduced by welding a plastic spherical lens to a cover by a laser beam, without using an adhesive or a special component.

JP-A No. 261986/2004 describes that the thickness of a laser transmitting resin is continuously changed in an overlapping corner portion, in order to prevent occurrence of a malfunction, such as poor welding caused by the difference in the movement of the laser beam between the outer periphery and the inner periphery.

JP-A No. 354438/2004 describes that an optical component of resin is joined to a resin holder, by evaporating the resin of the resin holder by laser with an inert gas discharged, and by depositing the melted resin onto the optical component. This enables fixing without aberration.

JP-A No. 119050/2005 describes that a convex portion is provided on a surface of a laser transmitting resin to change the optical path length. This eliminates the nonuniformity of energy distribution in a melting spot at relatively low cost.

JP-A No. 231308/2005 describes that defects such as voids are prevented from occurring in the welding line between a transmitting resin and an absorption resin, by diverting the laser beam from the welding line, and by stopping irradiation of the laser beam at the end portion thereof to cause defects to occur only at the end portion.

With the technique disclosed in JP-A No. 20867/2004, it is possible to fix the lens with high accuracy. However, when the lens is joined at a point, it is difficult to ensure a large welding area to provide the necessary welding strength. On the other hand, when welding is performed by scanning a laser beam, nonuniformity is likely to occur in the usual manner and result in poor welding at the end portion of laser scanning. However, in JP-A No. 20867/2004, there is no description of the above problem and its solution.

With the techniques disclosed in JP-A Nos. 261986/2004 and 119050/2005, it is possible to change the shape of the laser intensity distribution by varying the thickness and shape on the transmitting resin side. This structure is suitable for large parts such as automobile components. However, the optical component of the optical pickup is very small of millimeter order. Thus, even if the thickness of the laser irradiation part is somewhat changed on the transmitting resin side, there is a small change in the laser intensity distribution as a function of the optical path difference.

With the technique described in JP-A No. 354438/2004, it is difficult to deposit the melted resin at a certain amount and at an appropriate position when the inert gas is discharged. Thus the yield is low. Further, joint irregularities are likely to occur. As a result, it is difficult to ensure good welding performance.

With the technique described in JP-A No. 231308/2005, in particular, generation of void can only be prevented. However, there remains the problem of peeling due to excessive residual stress at the end portion.

SUMMARY OF THE INVENTION

The present invention aims at providing a high yield and reliable optical pickup device, and a laser welding structure of an optical component. To achieve this, it is desirable that in a laser welding method, in particular, peeling of end portion is prevented to ensure the welding strength, and displacement of optical component due to environmental changes is reduced.

An optical pickup device according to the present invention includes a pickup case formed of a first resin, and an optical component including a lens and formed of a second resin, in which the optical component is laser welded in place on an optical path of the pickup case. The optical component has at least one protrusion having a convex shape at an end portion thereof, to join the optical component to the pickup case. Laser beam irradiation is performed partially extending beyond a contact surface between a flat portion of the convex portion of the optical component and a flat portion of the pickup case, so that the protrusion of the optical component has a laser welded portion thicker than a laser welded portion of the contact surface.

In the present invention, an area of the thick welded portion is smaller than an area of the laser welded portion of the contact surface.

In the present invention, the laser welded portion of the contact surface is parallel to a bottom surface of the pickup case. A height from the bottom surface to the joint surface is substantially equal to a height of a center of the lens of the optical component.

In the present invention, a length L1 in an optical axis direction of the protrusion of the optical component is smaller than a length L2 in the optical axis direction of the optical component.

In the present invention, the optical component has at least two protrusions having a convex shape at symmetrical positions with respect to the optical axis. Only the convex portion of one of the protrusions has a welded portion formed on the joint surface to the pickup case.

In the present invention, the optical component is fixed by welding the protrusion having a convex shape of the optical component, the protrusion being provided with an incline on the opposite side of the welded surface of the convex portion, with respect to the laser irradiated surface.

In the present invention, the optical component is fixed by welding the protrusion having a convex shape of the optical component, with the roughness R2 of a portion other than the flat portion of the contact surface to the pickup case, being larger than the roughness 1 of the flat portion.

In the present invention, the pickup case has an incline, a portion of the incline being welded in the vicinity outside the flat portion of the convex portion of the optical component.

In the present invention, at least a portion of an end of the convex portion of the protrusion is coated with an adhesive.

In the present invention, the degree of elasticity or hardness of the adhesive is lower than that of the resin of the optical component.

According to the present invention, in the laser welding method, peeling of end portion is prevented and displacement of optical component due to environmental changes is reduced. As a result, the yield and reliability of the optical pickup device are improved.

DETAILED DESCRIPTION OF THE PREFERRED EMBODIMENTS

Figure 14:
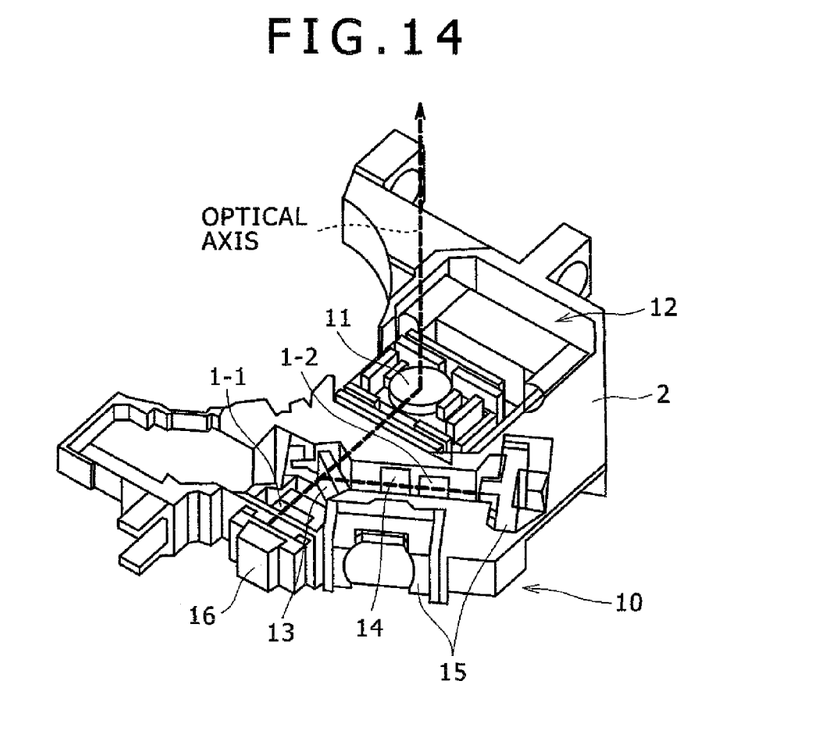
FIG. 14 is an external view showing an example of the optical pickup device 10 according to the present invention.

Hereinafter, preferred embodiments of the present invention will be described with reference to the accompanying drawings. FIG. 14 is an external view showing an example of an optical pickup device 10 according to the present invention. Here, a detection lens 1-1 and an auxiliary lens 1-2 are an optical component 1 to be fixed. The optical component 1 is fixed to a pickup case by laser welding. Reference numeral 11 denotes an objective lens, reference numeral 12 denotes an actuator, reference numeral 13 denotes a half mirror, reference numeral 14 denotes a prism, reference numeral 15 denotes a laser diode, and reference numeral 16 denotes a photodiode.

Figure 15:
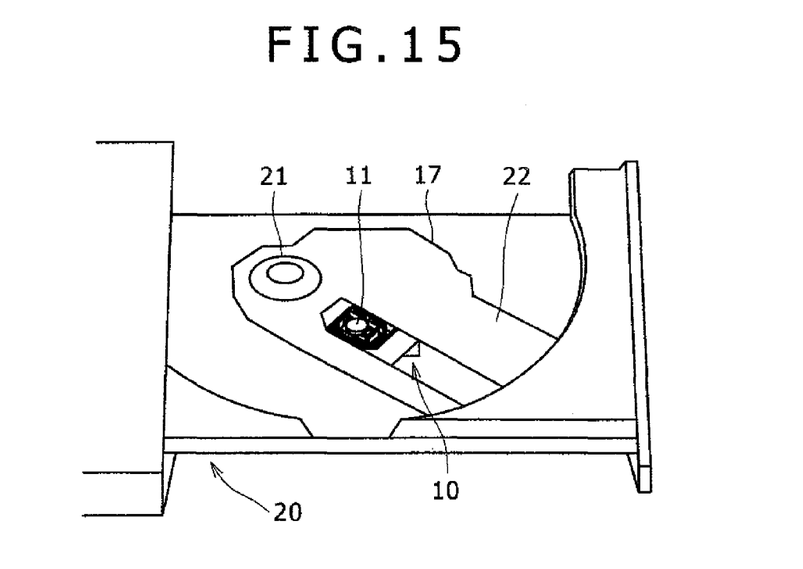
FIG. 15 is a view showing an example of an optical disk drive apparatus 20 in which the optical pickup device 10 is incorporated.

FIG. 15 is a view showing an example of an optical disk drive apparatus 20 in which the optical pickup device 10 is incorporated. Reference numeral 17 denotes a metal cover, reference numeral 21 denotes a spindle motor, and reference numeral 22 denotes a drive cover.

Figure 13A:
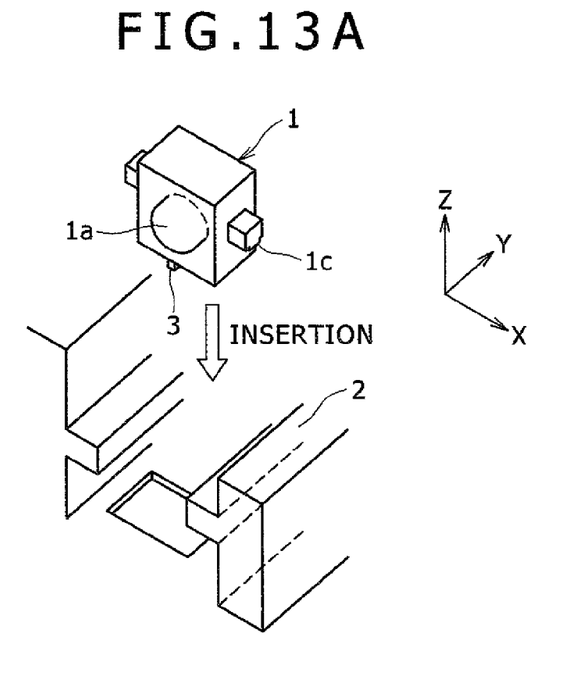
FIGS. 13A and 13B are views showing the assembly of the optical component 1 and the pickup case 2 in the optical pickup device 10.
Figure 13B:
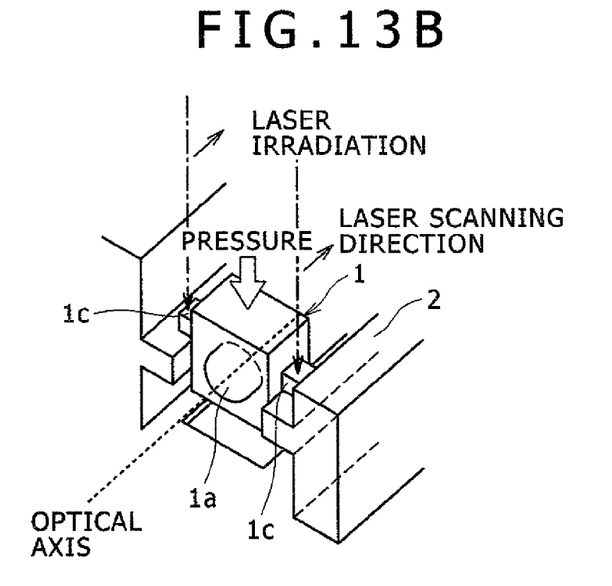

FIGS. 13A and 13B are views showing the assembly of the optical component 1 and the pickup case 2 in the optical pickup device 10. FIG. 13A shows a state before the optical component 1 is inserted into an accommodating portion. FIG. 13B shows a state in which the inserted optical component 1 is laser welded with a pressure applied thereto.

In FIG. 13A, the optical component 1 has, for example, a lens surface 1a in the Y direction (optical axis direction), and a protrusion 1c having a convex shape provided in the X direction for welding the optical component 1 to the pickup case 2.

In addition to the above, other lenses may be laser welded as the optical component 1 such as, for example, grating lens, coupling lens, and auxiliary lens. Because transparency and aberration characteristics are the most important for these lenses, transparent noncrystalline resins with a relatively low temperature limit are used as materials containing cycloolefin resin, PMMA (methyl methacrylate), fluorinated polyester, polycarbonate, or other materials. On the other hand, the pickup case 2 is formed from a black or gray crystalline resin with a high melting point and good heat resistance, such as PPS (polyphenylene sulfide), PBT (polybutylene terephthalate), or liquid polymer.

Incidentally, the optical component 1 made of resin is formed by molding, and a gate portion 3 is necessarily remains. So the gate portion 3 is preferably formed on the lower surface side (Z direction) of the optical pickup, unless the gate portion 3 interferes in the height direction. When the height is closely restricted, the gate portion 3 is preferably formed at a position on the side surface side (X direction) of the optical component 1, which is the same side of the protrusion 1c, and avoiding it.

In FIG. 13B, the optical component 1 and the pickup case 2 are fixed together by welding the protrusion 1c of the optical component 1. More specifically, with pressure applied to the optical component 1, a laser beam is irradiated onto the protrusion 1c from the upper direction (Z direction). The laser welding conditions are given taking into account the transmission/absorption rate, heat conductivity, and compatibility of the welding material in the laser irradiation wavelength. Thus, the laser conditions are defined in terms of spot size, power, irradiation time, intensity distribution, and pressure to be applied. The light source used for laser welding is preferably a laser in the infrared region, including a semiconductor laser and YAG laser, from the viewpoint of the resin transmission rate. Various types of light source intensity distribution can be taken depending on the type of the attached lens, such as Gaussian type, top hat type, or ring type. However, it is preferable to use the light source using a top hat or ring intensity distribution, in order to easily obtain a uniform welding state.

Further, adhesiveness between the flat portions of the optical component 1 and the pickup case 2 has a significant influence on the welding characteristics. Thus, it is preferable that the combination of resins is selected to satisfy the condition that the gap between the flat portion of the optical component 1 and the flat portion of the pickup case 2 can be 30μ or less, with pressure applied to the optical component 1, by taking into account the roughness of the contact portion of the protrusion 1c having a convex shape of the optical component 1, as well as the roughness of the pickup case 2.

Generally in the optical application, the optical component 1 is formed from a noncrystalline resin and the pickup case 2 is formed from a crystalline resin. However, the present invention can be applied to other combinations of resins to be joined.

In the optical component 1 applied below, the protrusion 1c and the welded portion 4 can have various shapes, which will be described in separate embodiments.

First Embodiment

Figure 1A:
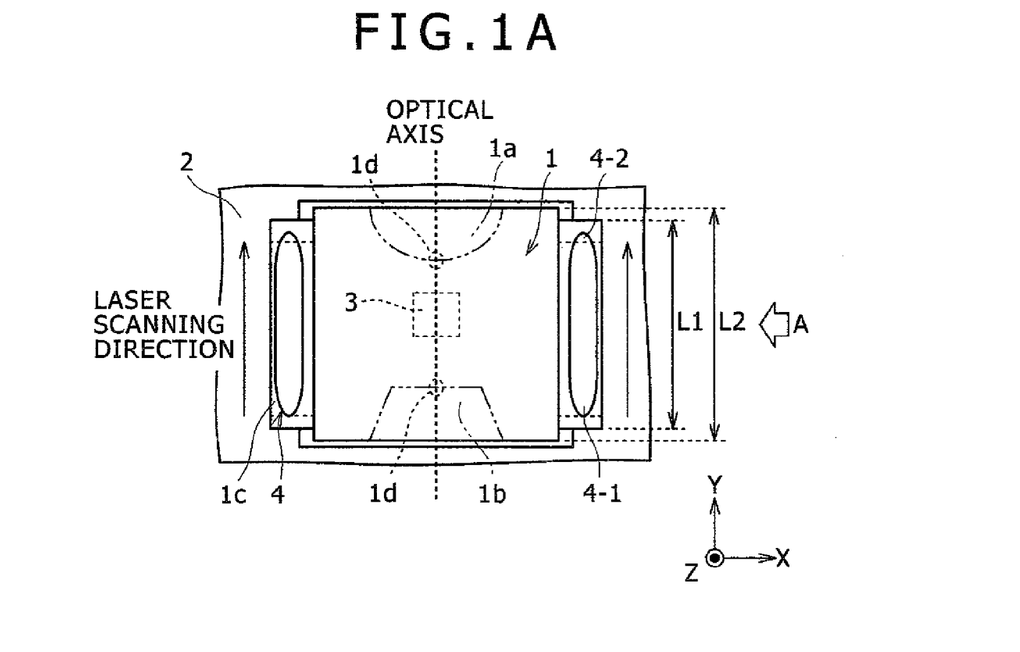
FIGS. 1A and 1B are views showing a structure in which an optical component 1 and a pickup case 2 are welded and fixed together in an optical pickup device 10 according to a first embodiment.
Figure 1B:
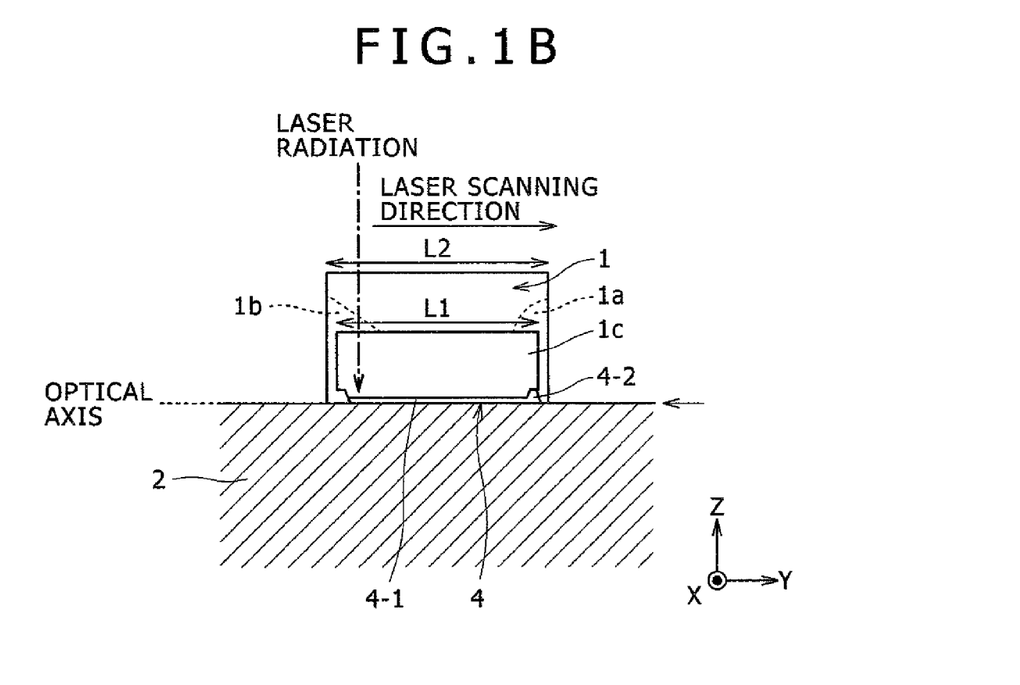

FIGS. 1A and 1B are views showing a structure of an embodiment in which the optical component 1 and the pickup case 2 are welded and fixed together in the optical pickup device 10 according to the present invention. FIG. 1A is a plan view seen from the Z direction (upper direction). FIG. 1B is a side view seen from the A direction. The optical component 1 shown in this embodiment has lens surfaces 1a, 1b in the optical axis direction (Y direction), and protrusions 1c having a convex shape on both sides thereof in the X direction with respect to the pickup case surface. Reference numeral 1d denotes a lens center through which the optical axis passes.

When the optical component 1 is laser welded to the pickup case 2, the optical component 1 is chocked or sucked by a jig. Then, in a state in which a surface of the convex shape portion of the protrusion 1c is pressed against a flat surface of the pickup case 2 (or in a pressed state), the optical component 1 welded through the protrusion 1c by scanning and irradiating a laser beam from the Z direction. Incidentally, when the laser beam is not scanned, the fixing jig side is scanned instead.

At this time, when only the contact flat portion is welded, the energy according to the movement of the laser or the fixing jig is supplied to the welded portion. At this time when a linear scan is performed, excessive welding is likely to occur at the laser irradiation end portion, often resulting in a poor state of welding such as generation of void. For example, when the optical component 1 is combined with the pickup case 2 containing glass or other material, the difference in the linear expansion coefficient between the optical component 1 and the pickup case 2 is large. In such a case, an excessive stress is generated at the end portion when welded, and peeling may occur during the welding process.

Although the welding is observed to be normally performed apparently, an excessive residual stress is generated at the end portion. The reliability test confirms that peeling occurs at the end portion and even progresses from the end portion as a starting point. Particularly, this phenomenon has been found at the laser scan end portion more often than at the laser irradiation start portion.

In this embodiment, the protrusion having a convex shape for welding the optical component 1 is provided at the end portion thereof in the X direction, apart from the center of the optical axis. Further, laser beam irradiation is performed extending to the laser scan end side beyond the contact surface between the flat portion of the convex portion and the flat portion of the pickup case. Thus, the protrusion having a convex shape has a laser welded portion 4-2 thicker than a laser welded portion 4-1 of the contact surface.

As a result, the thick welding portion prevents an excessive stress from being generated at the end portion, thereby enabling to prevent the occurrence of peeling at the end portion when welded. Further, the thick welded portion 4-2 helps reduce the concentration of stress on the contact surface in the vicinity of the end portion. Thus, high reliability can be expected. However, when there is a long distance between the flat portion of the convex portion formed in the optical component and the portion other than the flat portion, it is difficult to form the thick welded portion 4-2.

Thus, although the distance is dependent on the characteristics of the resin material, such as linear expansion coefficient and melting point, in the combination shown in this embodiment the distance is preferably within 50 μm. If the distance is too long, the heat does not escape to the upper side on the optical component side, and gas is likely to be generated. When gas is generated, both the lens and the surface of the laser, which is the light source, get dirty.

In laser welding, outgas is generated during the welding process although with a smaller amount than the adhesive.

Further, the absorption resin is rapidly heated at a portion where the resins do not fully adhere to each other. The amount of generated outgas increases compared to the case in which the resins fully adhere to each other. With this structure, the effect of trapping outgas can also be expected in the vicinity of the end portion of the protrusion 1c having a convex shape, other than the thick welded portion 4-2.

In addition, the length L1 of the protrusion having a convex shape in the laser scanning direction is made smaller than the length L2 of the optical component. With this structure, it is possible to greatly reduce the possibility that outgas will be generated and attached to the lens surface.

Figure 2:
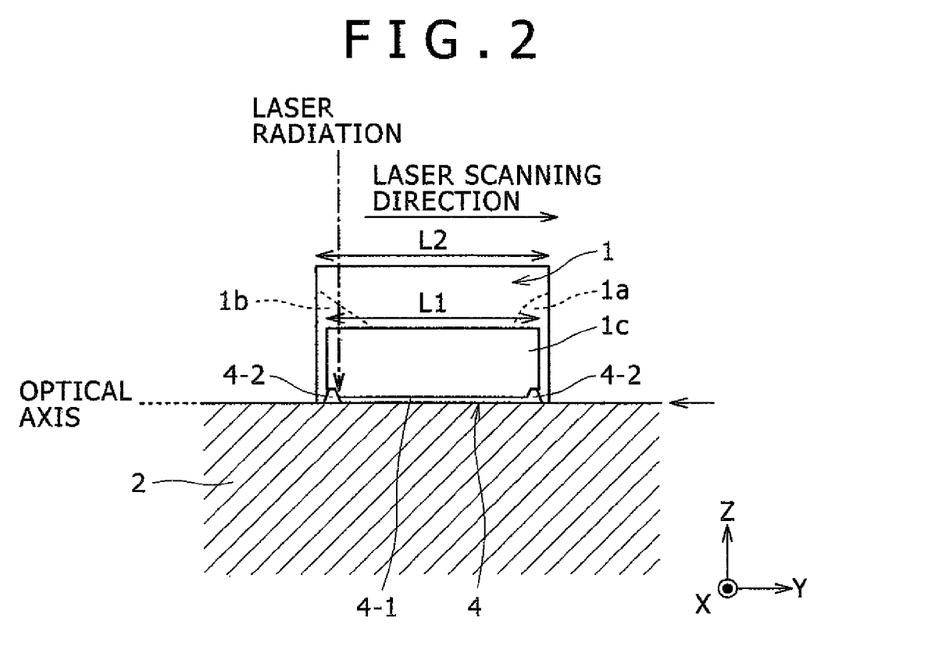
FIG. 2 is a plan view showing a variation of a welded portion 4 in FIGS. 1A and 1B.

FIG. 2 is a side view showing a variation of the welded portion in FIG. 1. As shown in the figure, the thick welded portion 4-2 can be formed not only in the vicinity of the laser scan end but also in the vicinity of the laser irradiation start point, by scanning and irradiating a laser beam starting from the outside of the flat portion. This structure is very effective in terms of reducing the concentration of stress at both ends.

Figure 3:
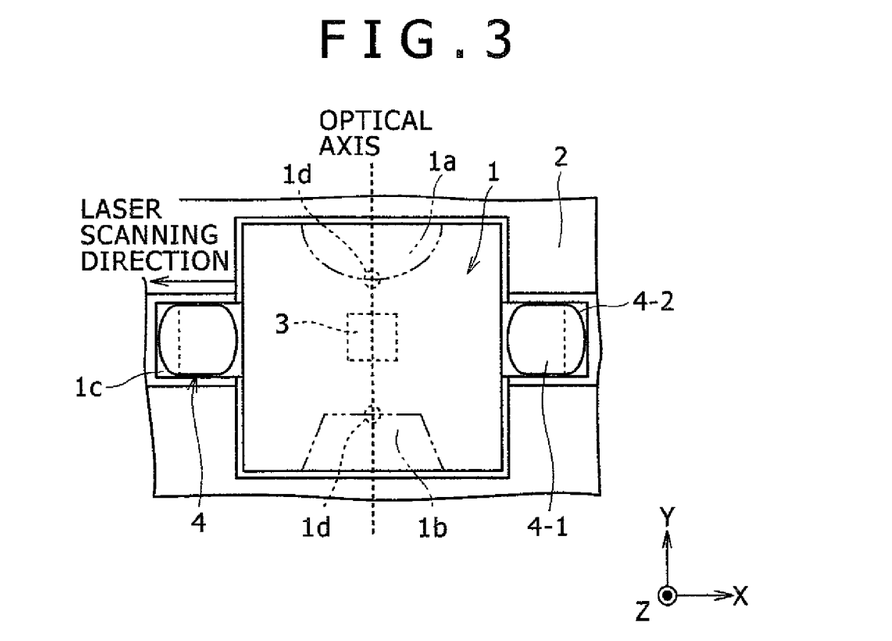
FIG. 3 is a plan view showing a variation of the welded portion 4 in FIGS. 1A and 1B.

FIG. 3 is a plan view showing a variation of the welded portion in FIG. 1. With the recent expansion of the functionality of the optical pickup device, the number of types of the optical component 1 to be mounted on the pickup case increases. Thus, when it is difficult to ensure the length of the protrusion 1c having a convex shape of the optical axis direction in design, the protrusion 1c having a relatively long convex shape is preferably formed in the direction perpendicular to the optical axis direction for laser welding.

Figure 4A:
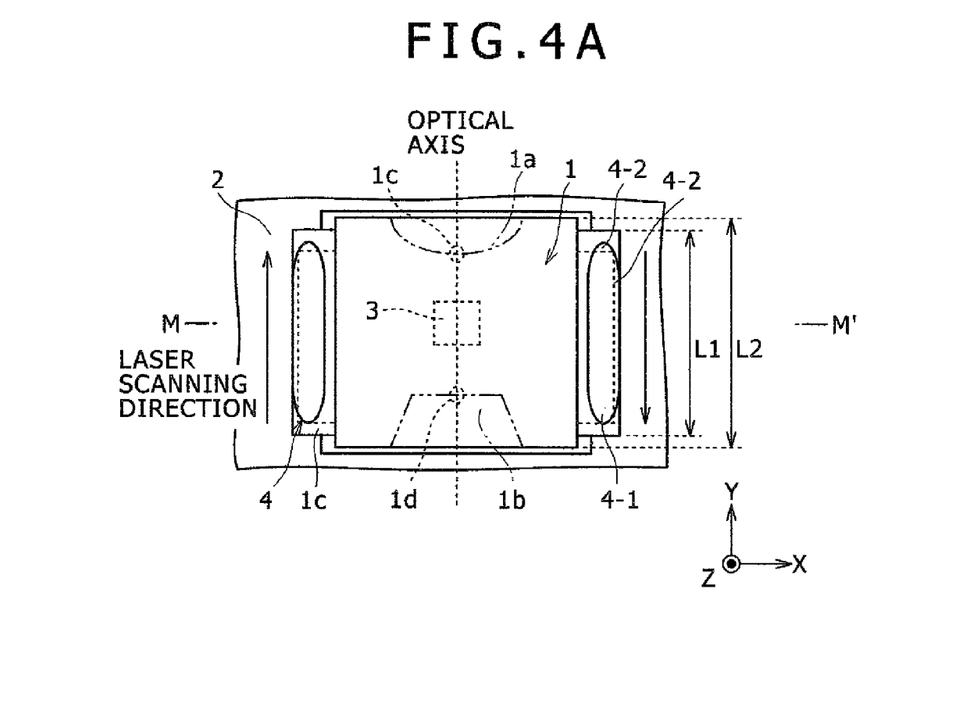
FIGS. 4A and 4B are plan views showing a variation of the welded portion 4 in FIGS. 1A and 1B.
Figure 4B:
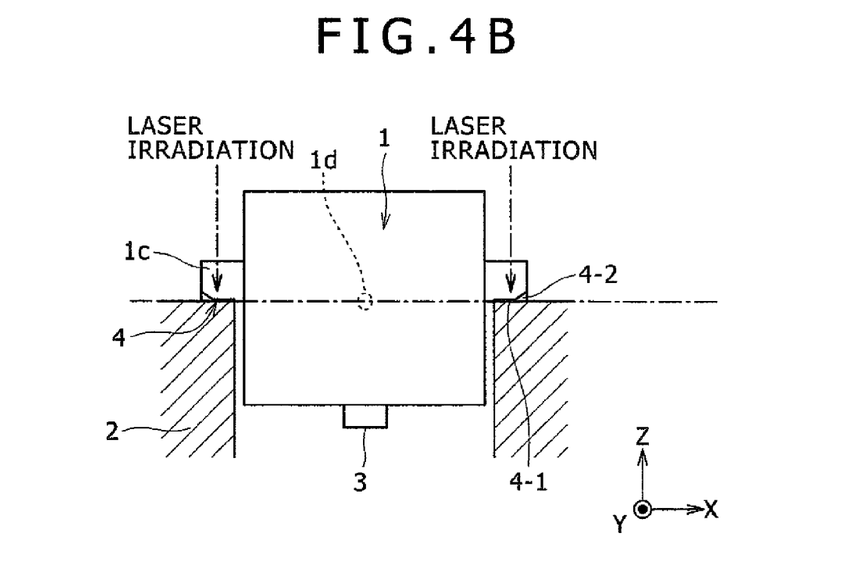

FIGS. 4A and 4B are views showing a variation of the welded portion in FIGS. 1A and 1B. FIG. 4A is a top view, and FIG. 4B is a cross-sectional view. As shown in FIGS. 4A and 4B, it is possible to form the thick welded portion 4-2 also at the end portion on the opposite side of the optical axis and parallel to it, by irradiating a laser beam having a spot size larger than the contact surface of the protrusion 1c having a convex shape. Whit this structure, an increase in the welding strength can be expected.

However, in the thick welded portion 4-2, a void is more likely to occur than in the welded portion 4-1 of the contact surface. In addition, the thicker the welded portion, the more likely resin deformation occurs due to environmental changes. For this reason, the area of the thick welded portion 4-2 should be made smaller than the area of the welded portion 4-1 of the contact surface, in order to take advantage of the thick welded portion 4-2.

As shown in FIGS. 1A to 4B, the surfaces (XY surfaces) to be welded to the pickup case 2 are perpendicular to the lens surfaces 1a, 1b (XZ surfaces). In this state, the optical component 1 is welded to the pickup case 2 at the protrusions 1c having a convex shape provided on both ends of the optical component 1, respectively, on opposite sides of the optical axis. At this time, the height of the welding surface from the bottom surface of the pickup case 2 is substantially equal to the height of the lens center 1d. In this way, the height of the lens center 1d can be kept at a constant position, even if the surrounding environmental conditions are changed.

Second Embodiment

Figure 5A:
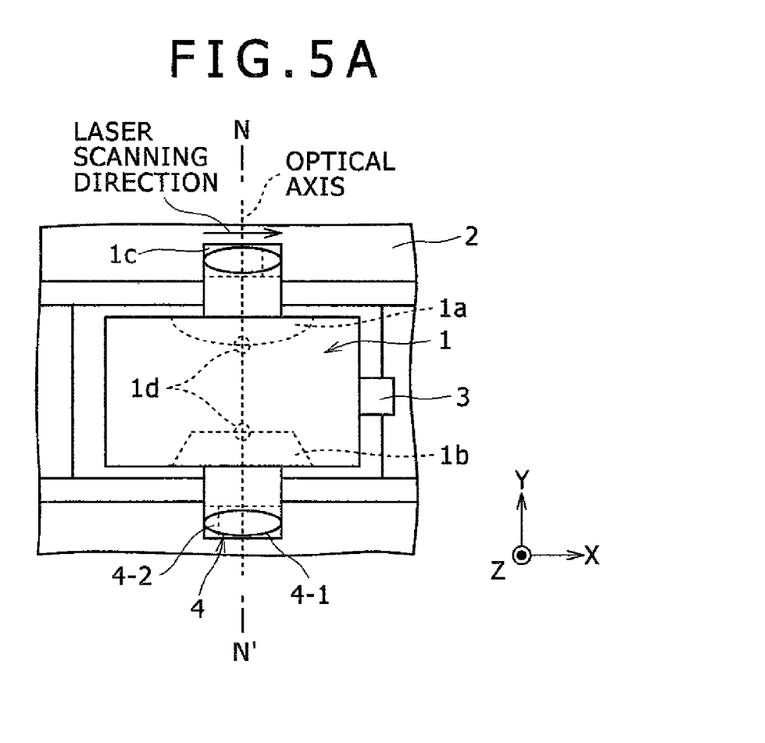
FIGS. 5A and 5B are views showing another structure in which the optical component 1 and the pickup case 2 are welded and fixed together in the optical pickup device 10 according to a second embodiment.
Figure 5B:
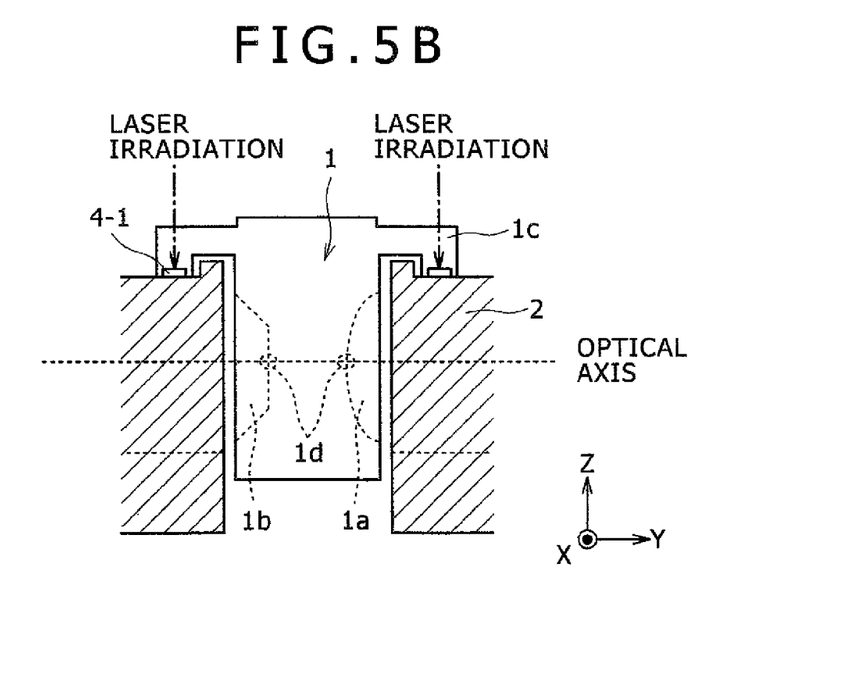

FIGS. 5A and 5B are views showing the structure of another embodiment in which the optical component 1 having the protrusions 1c having a convex shape, and the pickup case 2 are welded and fixed together in the optical pickup device 10 according to the present invention. FIG. 5A is a plan view seen from the Z direction. FIG. 5B is a cross-sectional view along the optical axis direction N-N' seen from the X direction. In this embodiment, portions outside the lens surfaces 1a, 1b of the optical component 1 are extended in the optical axis direction (Y direction). The protrusion 1c having a convex shape is formed at both ends of the extended portions, in which welding is performed with the laser scanning length longer than the contact surface with the pickup case 2.

This embodiment is effective when the optical component 1 may not be welded at the end portions thereof in the X direction, due to restriction in the design of the optical pickup device 10. In this case, the protrusions 1c are formed at positions sufficiently separated from the optical axis, respectively. In other words, the heights of the protrusions 1c from the optical axis to the welded portions 4 are higher than the outer peripheries of the lens surfaces 1a, 1b, respectively. This ensures that the protrusions 1c will not interfere with the light transmission regions of the lens surfaces 1a, 1b.

Incidentally, in this structure, convex portions are provided on the upper surfaces of the pickup case 2, in order to prevent penetration of outgas from the welded portion 4 to the lens surfaces 1a, 1b. In particular, the height of the convex portions is preferably as high as possible. Further, the welding positions are not necessarily above the optical axis (X=0). In the embodiments of FIGS. 1A to 5B, the welding surfaces are perpendicular to the lens surfaces 1a, 1b (XZ surfaces). With this structure, it is possible to prevent attachment of outgas generated in the welded portion 4 to the lens surfaces 1a, 1b as much as possible.

Figure 6A:
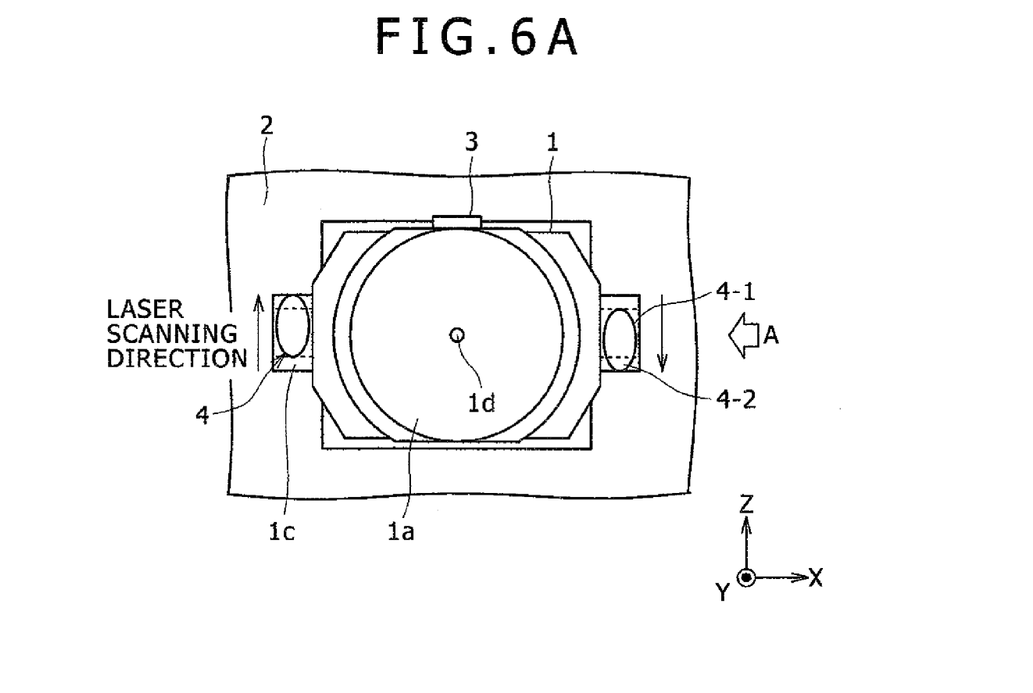
FIGS. 6A and 6B are views showing still another structure in which the optical component 1 and the pickup case 2 are welded and fixed together in the optical pickup device 10 according to the second embodiment.
Figure 6B:
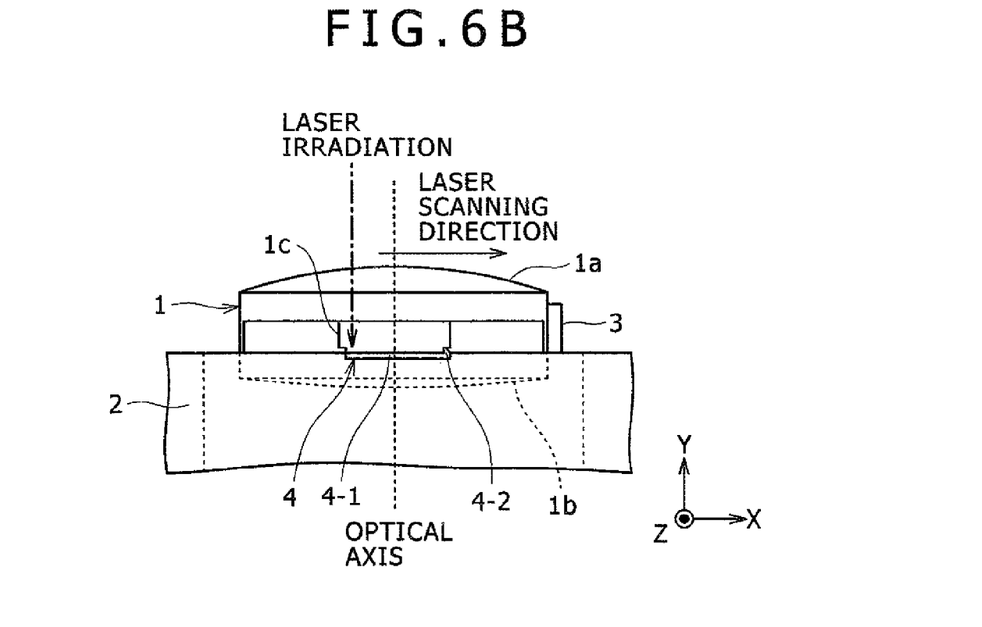

FIGS. 6A and 6B shows another embodiment, in which FIG. 6A is a plan view seen from the optical axis direction, and FIG. 6B is a side view seen from the A direction. In the embodiments described above, the laser irradiation for welding and the optical axis of the optical component are perpendicular to each other. However, the welded portion can also be formed in the same direction as the optical axis direction when the pickup case is formed from a material such as a resin generating less outgas. In this case, however, the welding surface, on which the welded portion of the flat portion and the welded portion thicker than the flat portion are formed, should not be at the same level as the lens surface. In this embodiment, the Y direction is the optical axis, and may be the same as the above described height direction of the pickup case.

Third Embodiment

Figure 7:
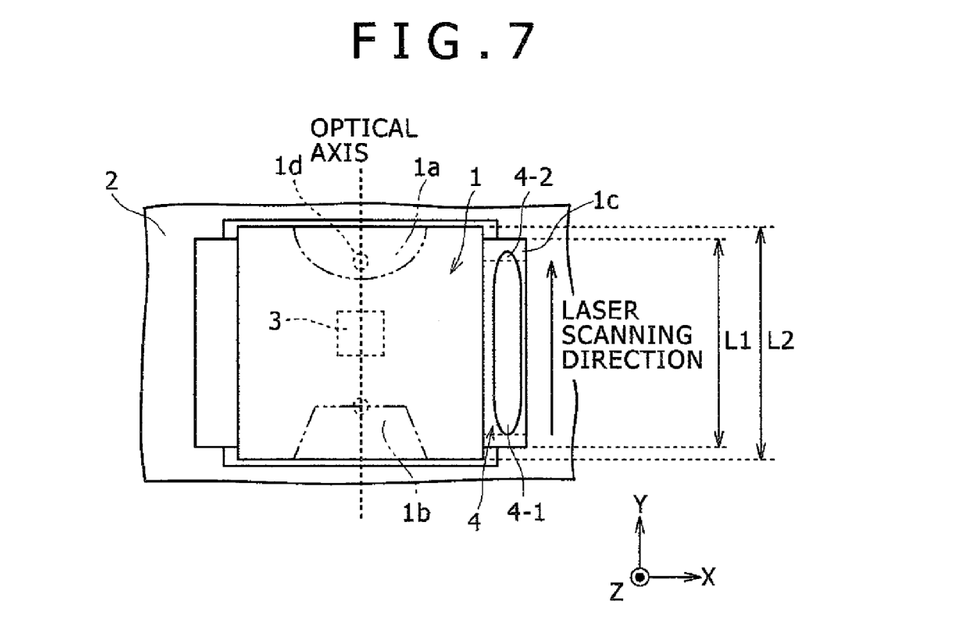
FIG. 7 is a view showing another structure in which the optical component 1 and the pickup case 2 are welded and fixed together in the optical pickup device 10 according to a third embodiment.

FIG. 7 is a view showing the structure of another embodiment in which the optical component 1 and the pickup case 2 are welded and fixed together in the optical pickup device 10 according to the present invention. In this embodiment, two protrusions are provided. Only one of the two protrusions is defined as the protrusion 1c having a convex shape in which the welded portion 4 is provided. In the case of welding only one place on one side, the stress applied to the welded portion 4 can be reduced, although the initial strength is smaller than that in the case of welding two places on both sides as described in the above embodiments 1 to 3. For this reason, such a one-place welding structure is even effective in the combination of resins having a satisfactory level of initial strength and indicating a strong influence of the difference in linear expansion coefficient between the resins.

Further, with the one-place welding structure, the stress applied to the lens surfaces of the optical component 1 can be reduced for the same reason as described above. The optical component 1 must satisfy the requirement that the aberration change due to environmental changes is small. This structure is effective when using the optical component 1 in which the aberration change is crucial, in other words, the optical component 1 is likely to be affected by the aberration change. This structure is also very effective when the welding surfaces are formed in the same direction as the optical axis as shown in FIGS. 6A and 6B.

While in this embodiment, since the optical component 1 is fixed at only one place on one side, the position of the optical component 1 (the lens center 1d) is displaced in the X direction (the left-to-right direction) by the linear expansion coefficient difference in high temperature operation, from the position in low temperature operation. In this case, taking into account the thermal expansion coefficient difference, the optical component 1 is provided at a position displaced in the X direction in advance before welding. Alternatively, when optical axis simulation is given in the design taking into account the displacement of the optical axis, the displacement is not an important problem.

Fourth Embodiment

Figure 8:
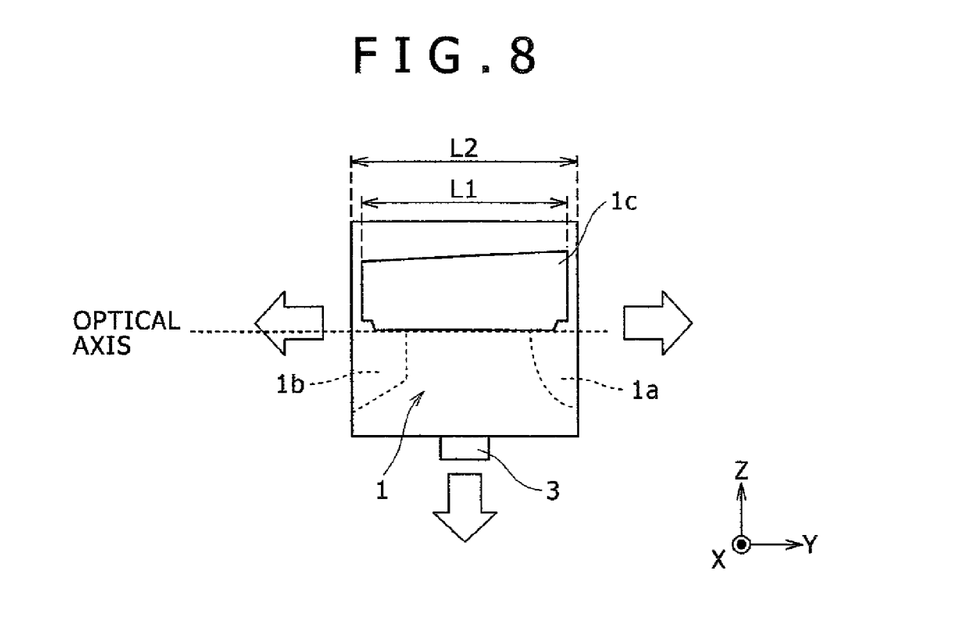
FIG. 8 is a view showing another structure of a protrusion having a convex shape of the optical component 1 of the optical pickup device 10 according to a fourth embodiment.

FIG. 8 shows another example of the structure of the protrusion 1c having a convex shape of the optical component 1 of the optical pickup device 10 according to the present invention. When the optical axis and the welding surface are perpendicular to each other as shown in the above welding embodiments, the mold is taken apart in the optical axis direction in order to form the lens surfaces 1a, 1b. The laser welded portion 4 is expected to have adhesiveness, so that high parallelism should be ensured.

Thus, with respect to the welding surface direction, another mold frame is used and taken apart in the Z direction to ensure the parallelism. However, when the portion of the protrusion on the opposite side of the welding surface is parallel to the contact surface, damage and a thickness difference are likely to occur at this portion. For this reason, it is preferable that the portion of the protrusion on the opposite side of the welding surface is not parallel to the contact surface, but is inclined at a certain angle. At this time, the inclined angle is 2 degrees or more.

Fifth Embodiment

Figure 9:
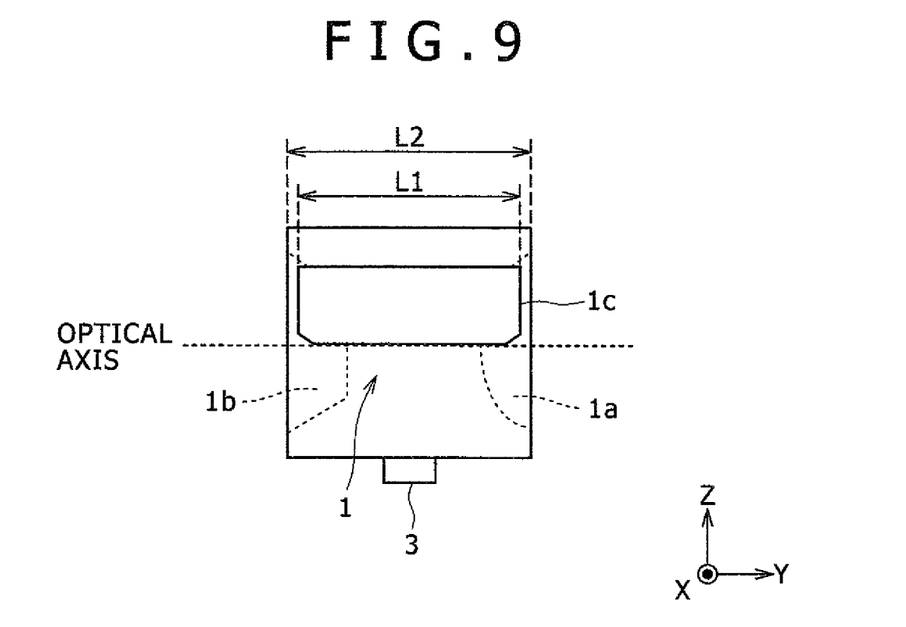
FIG. 9 is a view showing another structure of the protrusion having a convex shape of the optical component 1 of the optical pickup device 10 according to a fifth embodiment.

FIG. 9 shows another example of the structure of the protrusion 1c having a convex shape of the optical component 1 of the optical pickup device 10 according to the present invention. In this embodiment, the thickness between the flat portion and both end portions on the welding side of the protrusion 1c having a convex shape of the optical component is linearly changed. With this structure, when the laser welding is performed extending beyond the contact surface, the thickness of the thick welded portion 4-2 can be increased in stages. As a result, it is possible to form the thick welded portion 4-2 with high quality.

Figure 10:
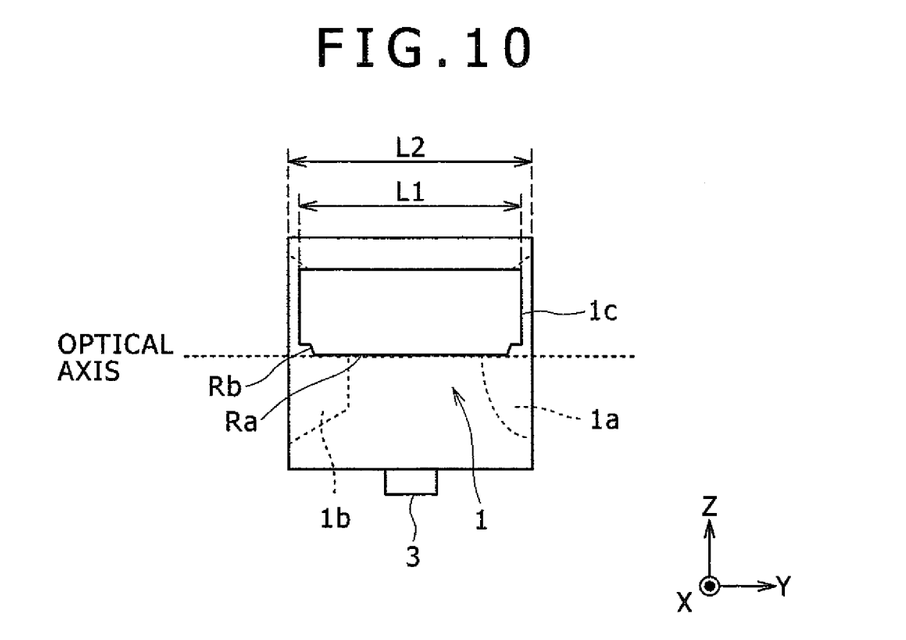
FIG. 10 is a view showing still another structure of the protrusion having a convex shape of the optical component 1 of the optical pickup device 10 according to the fifth embodiment.

FIG. 10 shows another example of the structure of the protrusion 1c having a convex shape of the optical component 1 of the optical pickup device 10 according to the present invention. In laser welding, welding is performed such that the absorption resin absorbs the energy of light and transfers heat to the transmitting resin. However, when very little heat transfer takes place, there is a tendency that the temperature of the absorption resin is only raised, resulting in generation of outgas.

Thus, when a resin tending to generate outgas is used or when the generation of outgas is a problem, the roughness Rb of a portion other than the flat portion is made larger than the roughness Ra of the flat portion. Light is scattered at the portion with the roughness Rb, so that the intensity of the incident laser beam can be reduced. As a result, it is possible to prevent generation of excessive outgas and hence eliminate attachment of outgas to the lens surfaces. The roughnesses Ra and Rb can be compared using Rz specified in JIS.

Sixth Embodiment

Figure 11:
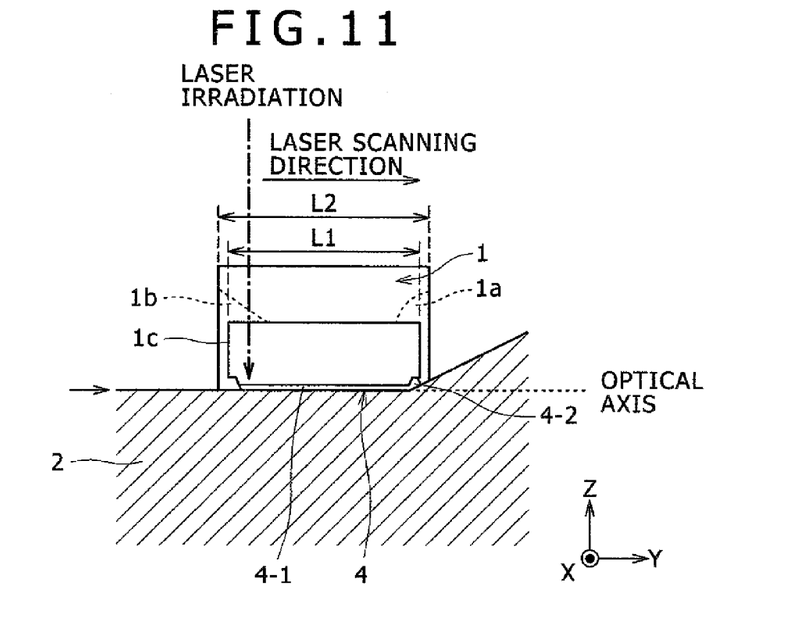
FIG. 11 is a view showing another structure in which the optical component 1 and the pickup case 2 are welded and fixed together in the optical pickup device 10 according to a sixth embodiment.

FIG. 11 is a view showing the structure of another embodiment in which the optical component 1 and the pickup case 2 are welded and fixed together in the optical pickup device 10 according to the present invention. In this embodiment, an incline is formed at a portion of the pickup case 2, in the vicinity of an end of the protrusion 1c having a convex shape formed in the optical component 1. With this structure, it is easy to form the thick welded portion 4-2.

This structure can be effective to weld the pickup case 2 and the optical component 1 when the molding accuracy of the resin used for the pickup case 2 is higher than the molding accuracy of the resin used for the optical component 1. Incidentally, the inclined portion may be at any angle and any position, as long as it is for forming the thick welded portion 4-2 at a position other than the contact flat portion.

Seventh Embodiment

Figure 12:
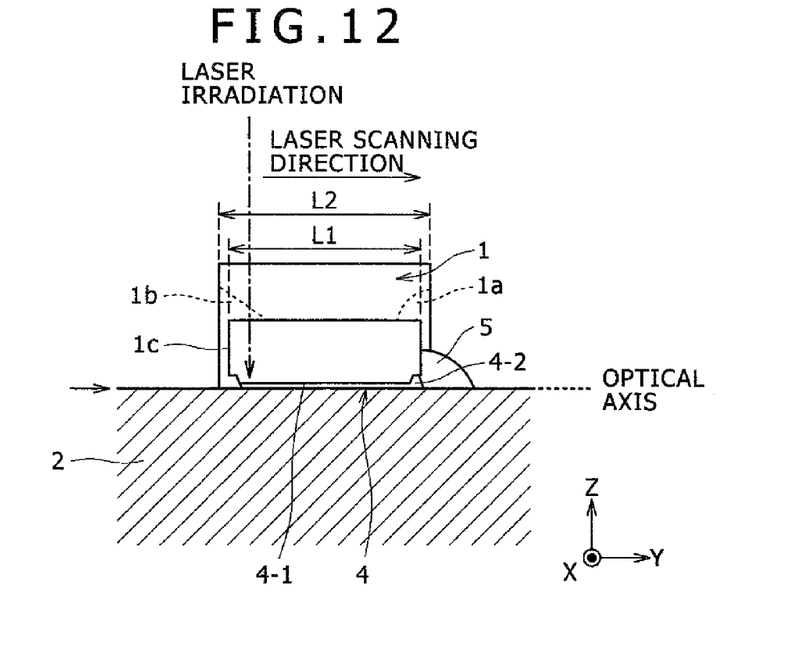
FIG. 12 is a view showing another structure in which the optical component 1 and the pickup case 2 are welded and fixed together in the optical pickup device 10 according to a seventh embodiment.

FIG. 12 is a view showing the structure of another embodiment in which the optical component 1 and the pickup case 2 are welded and fixed together in the optical pickup device 10 according to the present invention. In this embodiment, the vicinity of an end of the laser welded and fixed portion is coated with an adhesive 5. With this structure, it is possible to effectively increase the strength and hence prevent the peeling of the end portion. Further, when the welded portion 4 is entirely coated with an adhesive, it is possible to prevent moisture absorption to the welded portion 4 by the adhesive in environmental test, particularly at high temperature and high humidity.

Taking into account the aberration change, the degree of elasticity or hardness of the adhesive 5 shown here is preferably lower than that of the resins forming the optical component 1 and the pickup case 2. Further, the adhesive 5 preferably has a low viscosity of 30 Pa·s or less, in order to fill the gap with the adhesive 5. In addition, when taking into account workability, the adhesive 5 is preferably a UV adhesive.

In the above described embodiments, the joint strength can be further increased in laser welding or adhesion, by previously applying surface treatment and cleaning such as UV ozone treatment, corona discharge treatment, plasma treatment, or electron beam treatment to at least one of the optical component 1 or the pickup case 2.

The above embodiments have exemplified the optical pickup device 10. However, this structure is effective not only for the optical component 1 of the optical pickup device 10, but also for products using optical components such as cellular phones and digital cameras, as well as to improve the overall laser welding structure using components other than optical components. In other words, in the products such as cellular phones and digital cameras, the portion corresponding to the above described optical pickup device 10 is incorporated as an optical module.

In the above example, the laser welding method according to the present invention is used in the optical module and the like. However, the laser welding method according to the present invention has excellent advantages such as the welding strength increases and the welding stress on component is reduced. Thus, the method can also be applied to laser welding of components other than optical components.

What is claimed is:

1. An optical pickup device comprising:
a pickup case formed of a first resin; and
an optical component including a lens and formed of a second resin, the optical component being laser welded in place on an optical path of the pickup case,
wherein the optical component has a joint portion to be joined to the pickup case, the joint portion having a protrusion having a convex shape, and
wherein laser beam irradiation is performed partially extending beyond a contact surface between a flat portion of the protrusion of the optical component and a flat portion of the pickup case, so that a laser welded portion thicker than a laser welded portion of the contact surface is formed in the protrusion of the optical component, wherein an area of the thick laser welded portion is smaller than an area of the laser welded portion of the contact surface.

2. An optical pickup device comprising:

a pickup case formed of a first resin; and an optical component including a lens and formed of a second resin, the optical component being laser welded in place on an optical path of the pickup case, wherein the optical component has a joint portion to be joined to the pickup case, the joint portion having a protrusion having a convex shape, and wherein laser beam irradiation is performed partially extending beyond a contact surface between a flat portion of the protrusion of the optical component and a flat portion of the pickup case, so that a laser welded portion thicker than a laser welded portion of the contact surface is formed in the protrusion of the optical component, wherein two joint portions each having the protrusion are provided at positions symmetrical with respect to the optical axis of the optical component, and wherein one of the joint portions has a welded portion formed on the joint surface to the pickup case, while no welded portion is formed in another protrusion.

3. The optical module according to claim 2, wherein a length L1 in an optical axis direction of the joint portion of the optical component, is smaller than a length L2 in the optical axis direction of the optical component.

4. An optical pickup device comprising:

a pickup case formed of a first resin; and an optical component including a lens and formed of a second resin, the optical component being laser welded in place on an optical path of the pickup case, wherein the optical component has a joint portion to be joined to the pickup case, the joint portion having a protrusion having a convex shape, and wherein laser beam irradiation is performed partially extending beyond a contact surface between a flat portion of the protrusion of the optical component and a flat portion of the pickup case, so that a laser welded portion thicker than a laser welded portion of the contact surface is formed in the protrusion of the optical component, wherein a portion of an end of the joint portion of the optical component is coated with an adhesive.

5. The optical pickup device according to claim 4, wherein the degree of elasticity or hardness of the adhesive is lower than the degree of the resin of the optical component.

6. An optical module comprising:

a module case formed of a first resin; and an optical component including a lens and formed of a second resin, the optical component being laser welded in place on an optical path of the module case, wherein the optical component has a joint portion to be joined to the module case, the joint portion having a protrusion having a convex shape, and wherein laser beam irradiation is performed partially extending beyond a contact surface between a flat portion of the protrusion of the optical component and a flat portion of the module case, so that a laser welded portion thicker than a laser welded portion of the contact surface is formed in the protrusion of the optical component, wherein an area of the thick laser welded portion is smaller than an area of the laser welded portion of the contact surface.

7. An optical module comprising:

a module case formed of a first resin; and an optical component including a lens and formed of a second resin, the optical component being laser welded in place on an optical path of the module case, wherein the optical component has a joint portion to be joined to the module case, the joint portion having a protrusion having a convex shape, and wherein laser beam irradiation is performed partially extending beyond a contact surface between a flat portion of the protrusion of the optical component and a flat portion of the module case, so that a laser welded portion thicker than a laser welded portion of the contact surface is formed in the protrusion of the optical component, wherein two joint portions each having the protrusion are provided at positions symmetrical with respect to the optical axis of the optical component, and wherein one of the two joint portions has a welded portion formed on the joint surface to the pickup case, while no welded portion is formed in another joint portion.

8. The optical module according to claim 7, wherein a length L1 in an optical axis direction of the joint portion of the optical component, is smaller than a length L2 in the optical axis direction of the optical component.

9. An optical module comprising:

a module case formed of a first resin; and an optical component including a lens and formed of a second resin, the optical component being laser welded in place on an optical path of the module case, wherein the optical component has a joint portion to be joined to the module case, the joint portion having a protrusion having a convex shape, and wherein laser beam irradiation is performed partially extending beyond a contact surface between a flat portion of the protrusion of the optical component and a flat portion of the module case, so that a laser welded portion thicker than a laser welded portion of the contact surface is formed in the protrusion of the optical component, wherein a portion of an end of the joint portion of the optical component is coated with an adhesive.

10. The optical module according to claim 9, wherein the degree of elasticity or hardness of the adhesive is lower than the degree of the resin of the optical component.

* * * * *